US012746608B2

(12) United States Patent
Basei et al.

(10) Patent No.: US 12,746,608 B2
(45) Date of Patent: Sep. 29, 2026

(54) CLAMP FOR KEY CUTTING MACHINE

(71) Applicant: SILCA S.P.A., Vittorio Veneto (IT)

(72) Inventors: Mirco Basei, Codogne' (IT); Giorgio Pigatti, Cordignano (IT); Oreste Da Rodda, Revine Lago (IT)

(73) Assignee: SILCA S.P.A., Vittorio Veneto (IT)

( * ) Notice: Subject to any disclaimer, the term of this patent is extended or adjusted under 35 U.S.C. 154(b) by 813 days.

(21) Appl. No.: 18/029,623

(22) PCT Filed: Oct. 11, 2021

(86) PCT No.: PCT/IB2021/059290
§ 371 (c)(1),
(2) Date: Mar. 30, 2023

(87) PCT Pub. No.: WO2022/079571
PCT Pub. Date: Apr. 21, 2022

(65) Prior Publication Data

US 2023/0356308 A1 Nov. 9, 2023

(30) Foreign Application Priority Data

Oct. 12, 2020 (IT) ........................ 102020000023953

(51) Int. Cl.
*B25B 1/00* (2006.01)
*B23C 3/35* (2006.01)

(52) U.S. Cl.
CPC .................................... *B23C 3/355* (2013.01)

(58) Field of Classification Search
CPC .... B25B 1/00; B25B 1/04; B25B 1/10; B25B 1/06; B25B 1/24; B25B 5/02; B25B 5/04; B23Q 3/06; B23Q 3/00
See application file for complete search history.

(56) References Cited

U.S. PATENT DOCUMENTS 5,906,365 A * 5/1999 Wu ........................ B23C 3/355
269/319
6,641,339 B2 * 11/2003 Chies ...................... B23C 3/355
409/81

(Continued)

FOREIGN PATENT DOCUMENTS

| | | |
|---|---|---|
| AU | 2004222725 A1 | 5/2006 |
| CN | 211589303 U | 9/2020 |

(Continued)

*Primary Examiner* — Lee D Wilson
(74) *Attorney, Agent, or Firm* — Carmel Patent Agency; Robert Ballarini

(57) ABSTRACT

A clamp for key cutting machine includes: a lower jaw placeable on a support of a key cutting machine, having a first central hole for crossing a pin fixed to the support and allowing rotation of the lower jaw around the pin, the lower jaw having a first lower external face. An upper jaw is placed above the lower jaw and has a second central hole, aligned with the first central hole, for allowing the rotation of the upper jaw around the pin. The upper jaw having a first upper external face; and a lower insert and an upper insert. The lower jaw having a lower seat on the first lower external face and houses the lower insert, and the upper jaw is equipped with an upper seat on the upper external face and houses the upper insert configured to cooperate with the lower insert to clamp a key.

12 Claims, 8 Drawing Sheets

(56) References Cited

U.S. PATENT DOCUMENTS

| | | | | |
|---|---|---|---|---|
| 8,585,029 | B2 | 11/2013 | Ryai, Sr. | |
| 9,844,821 | B2 * | 12/2017 | Donadini | B23C 3/355 |
| 10,737,335 | B2 * | 8/2020 | Schmidt | B23Q 35/46 |
| 11,660,687 | B2 * | 5/2023 | Xi | B23Q 3/062<br>269/43 |
| 2002/0182022 | A1 * | 12/2002 | Chies | B23C 3/355<br>409/81 |
| 2010/0059916 | A1 * | 3/2010 | Pigatti | B25B 1/103<br>269/157 |
| 2012/0141221 | A1 * | 6/2012 | Wu | B23C 3/35<br>409/81 |
| 2016/0375505 | A1 * | 12/2016 | Donadini | B23C 3/355<br>409/81 |
| 2020/0238401 | A1 * | 7/2020 | Xi | B23Q 3/062 |

FOREIGN PATENT DOCUMENTS

| | | | |
|---|---|---|---|
| IT | 1222583 | B | 9/1990 |
| WO | 2015011095 | A1 | 1/2015 |

* cited by examiner

CLAMP FOR KEY CUTTING MACHINE

FIELD OF THE INVENTION

The present invention relates to a clamp for key cutting machine.

BACKGROUND

Flat key cutting machines with side bitting are known. They are usually provided with two clamps, one facing a mechanical feeler (in the case of mechanical key cutting machines) or an optical reader (in the case of electronic key cutting machines), and intended to clamp the original key to be duplicated, and one facing the cutter and intended to clamp the blank key to be coded. The two clamps are integral with each other and are movable with respect to the mechanical feeler/optical reader and to the cutter, which are generally fixed with respect to the base of the machine. To obtain a correct reproduction of the blank key bitting it is necessary that the original key and the blank key, and therefore the respective clamps, are longitudinally aligned precisely.

Fully digital keying machines are also known, which do not require the use of a feeler or an optical reader to detect the key to be duplicated but perform a duplication known in the technical jargon of the sector with the term "card", that is a duplication based on a map preloaded in a property sheet associated with the key, without the need to physically copy the previous key.

In particular, clamps with two superimposed jaws having a square plan and suitably shaped facing surfaces so as to be able to hold keys of different shapes together are known. In particular, in order to fix a key stably, the jaws of the clamps have ribs designed to penetrate inside the longitudinal grooves generally present in the key blade.

To obviate the fact that the keys have profiles of many shapes, all different from each other, the jaws are made in such a way as to present a different shape in correspondence with each of its faces, so that, with an appropriate choice and an appropriate positioning of the two jaws facing the cutter and the optical probe/reader, it is possible to adapt the same clamp to several different key profiles.

More in detail, according to the traditional technique such as for example that described in U.S. Pat. No. 9,844,821 or IT1222583, the jaws of the clamp are mounted on a vertical pin fixed to a support, mounted on a mobile structure in the X and Y directions of the machine with respect to the base, to which the cutter and the optical feeler/reader (if present, if the machine is mechanical or electronic) are fixed; in particular, the jaws are mounted on said pin in such a way as to allow each jaw to be able to rotate with respect to the other and with respect to their support. Such clamps are known in the technical jargon of the sector with the term "revolving clamps". Advantageously, according to the traditional technique, the correct positioning of the lower jaw of the clamp with respect to its support is generally obtained by means of vertical pins integral with the support itself and engaging in corresponding holes made in the lower jaw. The drawback of this solution is that the realization of the clamp is rather laborious and furthermore its engagement in the pins of the support is difficult.

The revolving clamps for key cutting machines currently available on the market are equipped externally with four different faces, which are designed and manufactured in such a way as to adequately clamp a predetermined corresponding flat key profile.

In this situation, a first face of the aforesaid four faces can, for example, be equipped with jaws suitable for gripping a certain type of key profile, while the second cannot do so as it is designed and intended for gripping different profiles.

The choice of the face of the clamp jaws, to be used to clamp the key, usually depends on the thickness of the key, its length, the position of the stop/limit stop (usually made by means of a protruding tooth at the beginning of the head or of the tip of the key blade) and the shape of the profile (i.e. the cross section of the stem is defined by the position, shape and size of the ridges and valleys with respect to its longitudinal extension and/or the presence of any ribs and/or grooves).

However, the known type clamp briefly described up to now has proved to be not free from drawbacks in practice.

A first drawback resides in the fact that, given the huge variety of flat keys available on the market, a four-sided swivel clamp is compatible only with a small subset of available flat keys and this substantially forces the operator of a key cutting machine (generally provided at a key duplication center) to equip itself with several clamps equipped with different types of jaws in order to cover most of the types of flat keys on the market or at least in the geographical area in which he operates, in so as to be able to satisfy the demands of its customers.

The need for the user/operator to purchase several clamps obviously has the inherent drawback of greatly increasing costs, since each new clamp has a particularly high cost.

Furthermore, often the cost incurred by the user/operator to purchase a new clamp is too high compared to the actual use of the clamp itself, as in many cases one or more sides of the clamp itself remain unused if the keys are compatible with them are not widespread in the particular market area in which the user operates.

A further drawback manifested by known type clamps resides in the fact that, during the normal key duplication activity, for the operator to pass from one clamp to another always involves a considerable and undesirable waste of time. This waste of time cannot be solved in any way with known type terminals, in fact if a customer is present with a non-clampable key on the already installed terminal, it is necessary to proceed with the removal of the latter and the installation of a second and different one.

Currently, therefore, the operator uses the known type clamps in a limited way, despite the important expense incurred for their purchase, and with a certain waste of time in passing from one clamp to another and vice versa.

SUMMARY

The object of the invention is to propose a clamp which allows to solve, at least in part, the drawbacks present in the known art.

A further object of the invention is to propose a clamp which allows to solve the need, foreseen in the traditional technique, to change the clamp according to the type of key to be clamped.

A further object of the invention is to propose a clamp for key cutting machine which is extremely versatile and which allows high productivity for the operator.

A further object of the invention is to propose a clamp for a key cutting machine which is constructively reliable.

A further object of the invention is to propose a clamp which is easy and quick to use and/or install.

A further object of the invention is to propose a clamp which can be obtained simply, quickly and with low costs.

A further object of the invention is to propose a clamp which can also be used in duplicating machines already available on the market.

A further object of the invention is to propose a clamp which is an improvement and/or alternative with respect to traditional solutions.

All these purposes, either individually or in any combination thereof, and others which will result from the following description, are achieved, according to the invention, with a clamp according to the appended claims.

BRIEF DESCRIPTION OF THE DRAWINGS

The present invention is further clarified hereinafter in a preferred one. embodiment shown for purely illustrative and non-limiting purposes with reference to the attached drawings, in which.

DETAILED DESCRIPTION OF THE PREFERRED EMBODIMENTS

Figure 1:
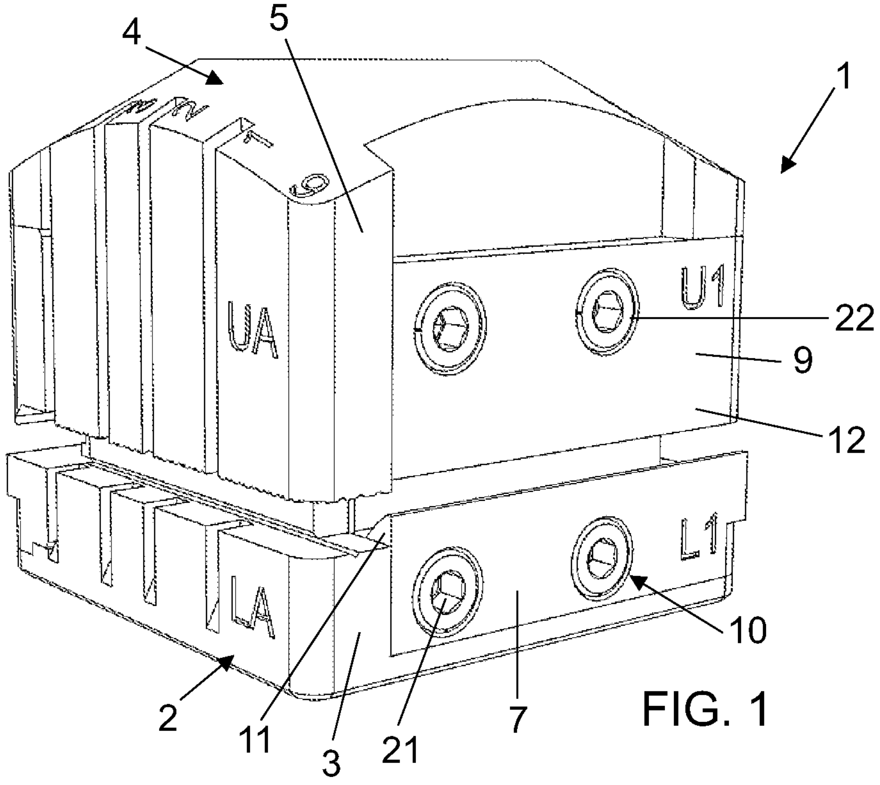
FIG. 1 shows a terminal according to the invention in perspective view.
Figure 2:
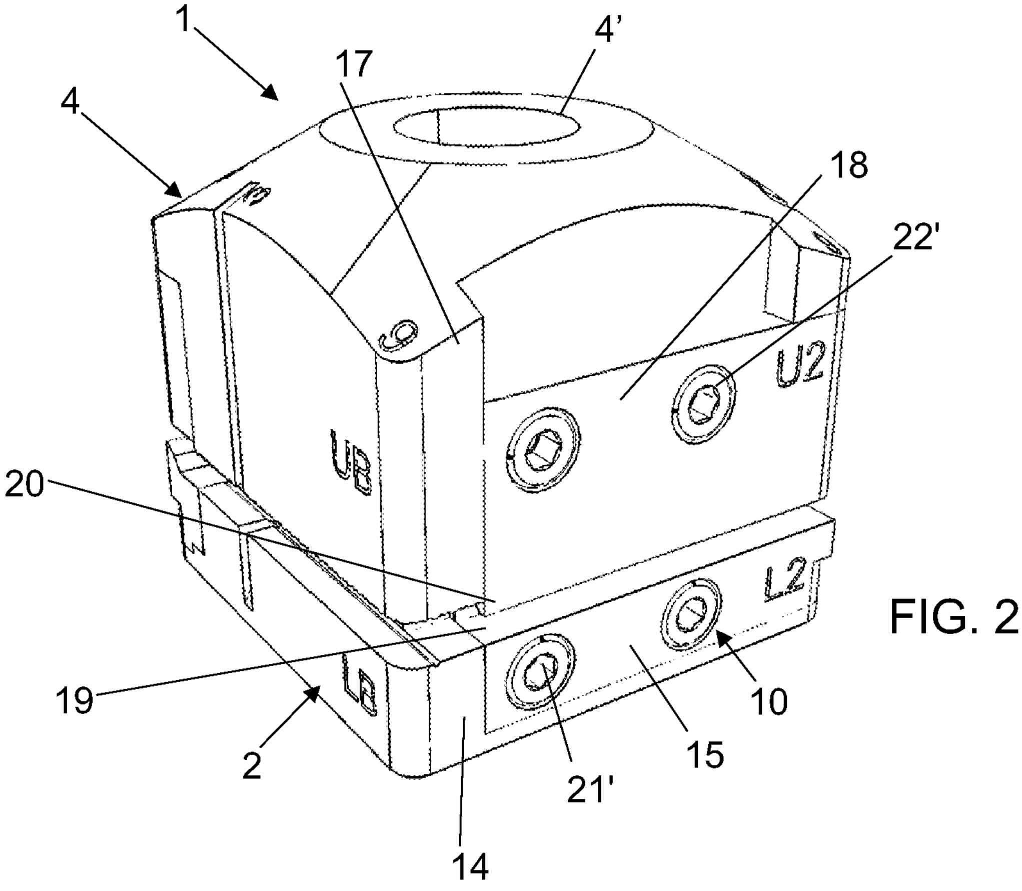
FIG. 2 shows it in a different perspective view.
Figure 3:
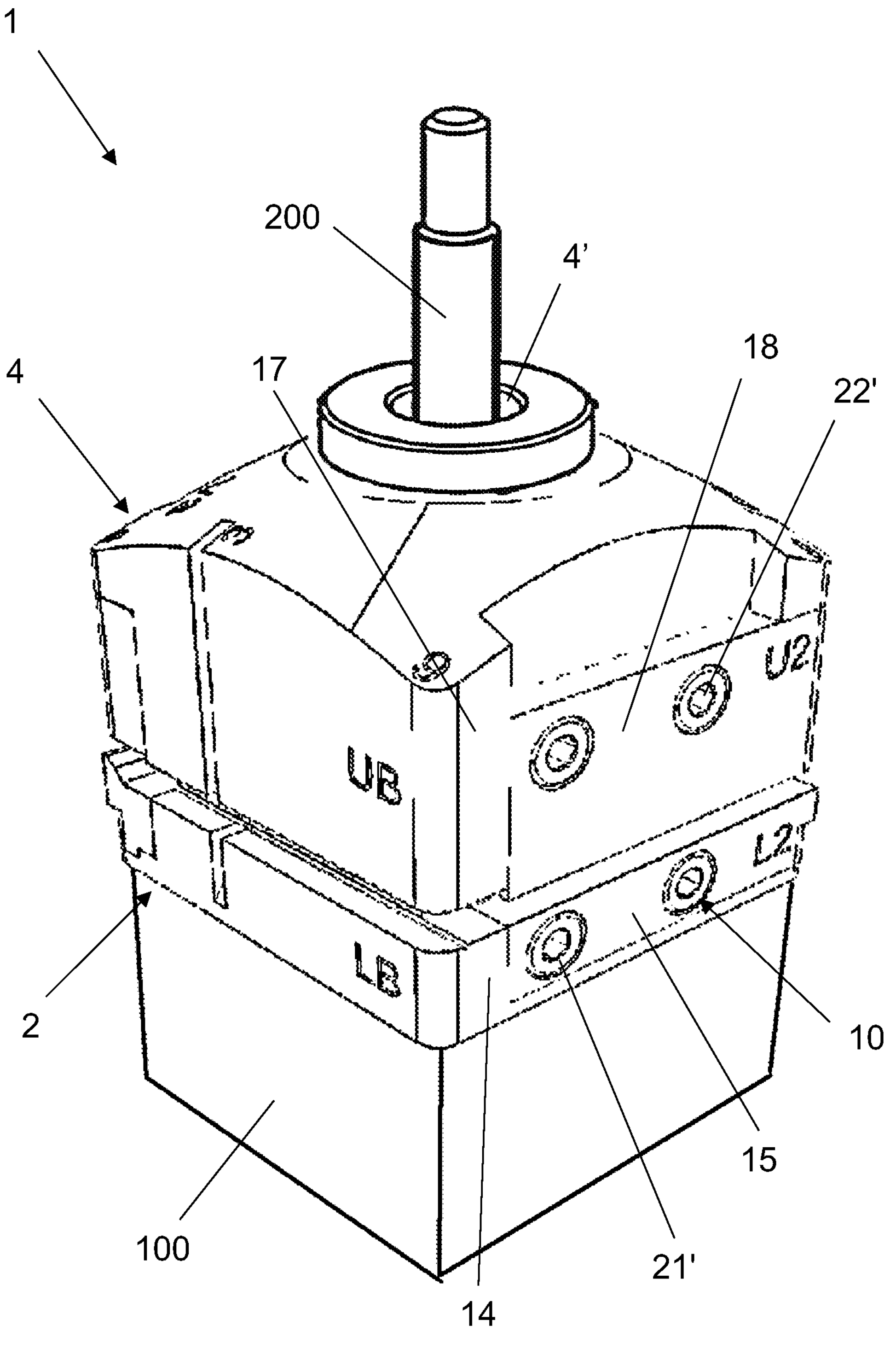
FIG. 3 shows it in perspective view mounted on a support of a key cutting machine.
Figure 4:
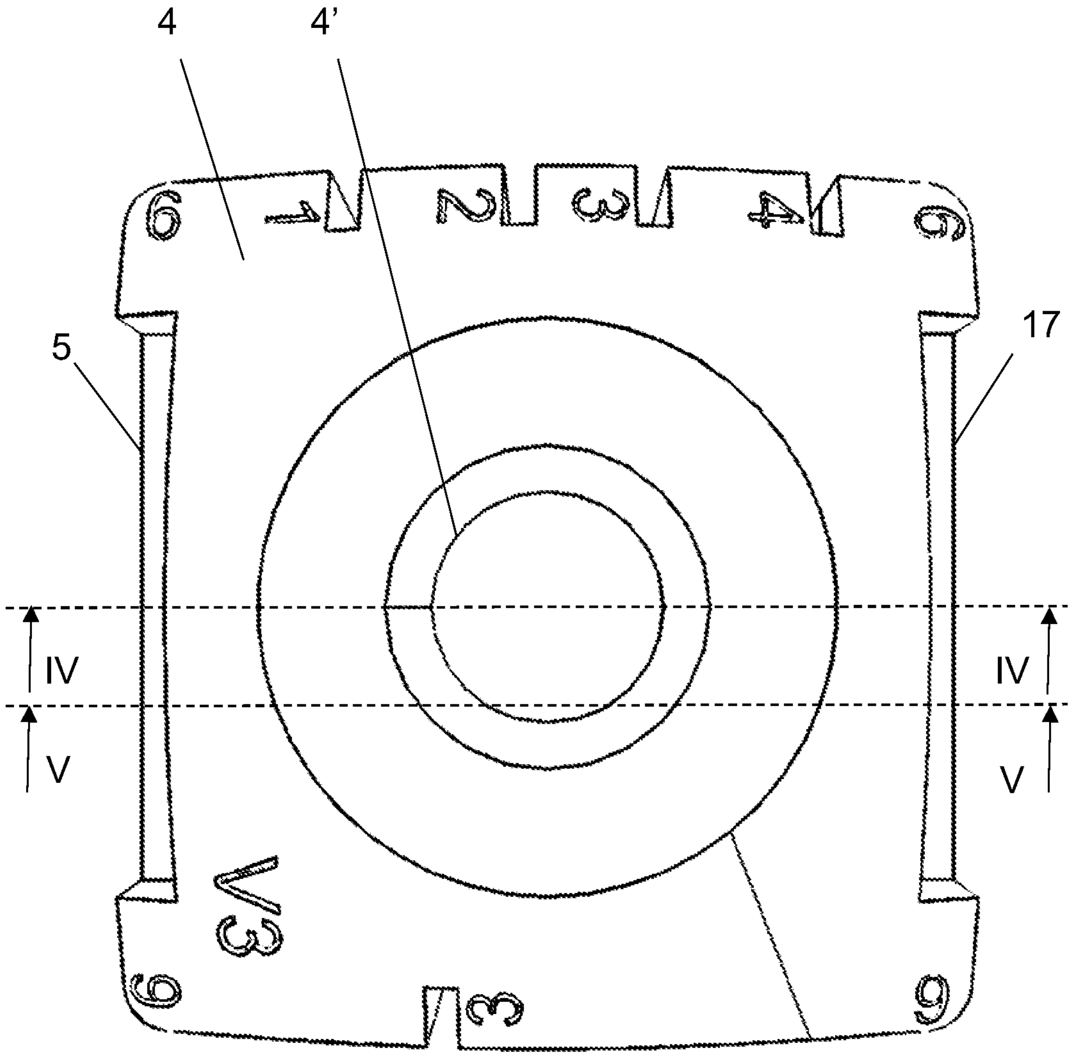
FIG. 4 shows the clamp according to the invention in a top plan view thereof.
Figure 5:
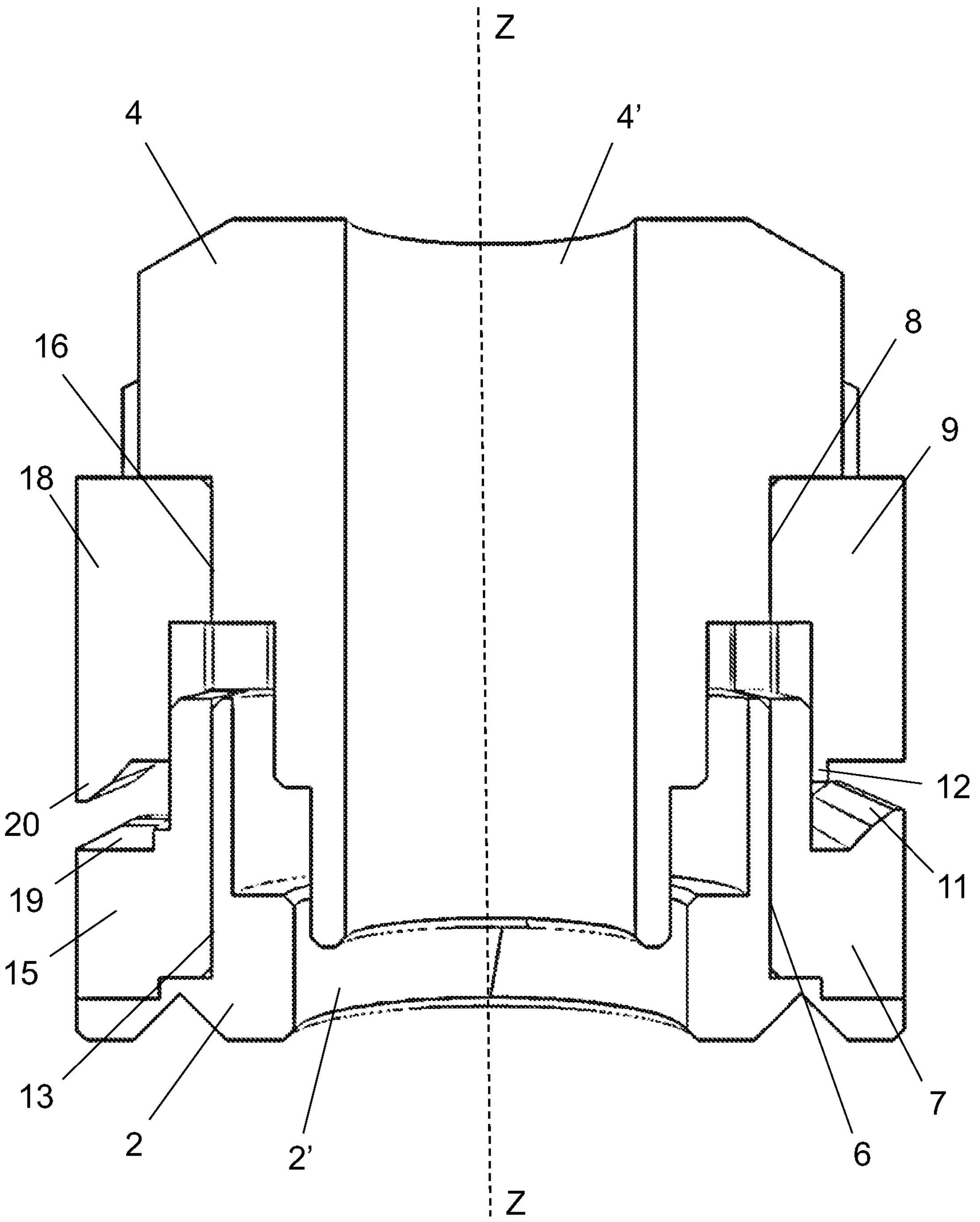
FIG. 5 shows a sectional front view made along the track IV-IV of FIG. 4.
Figure 6:
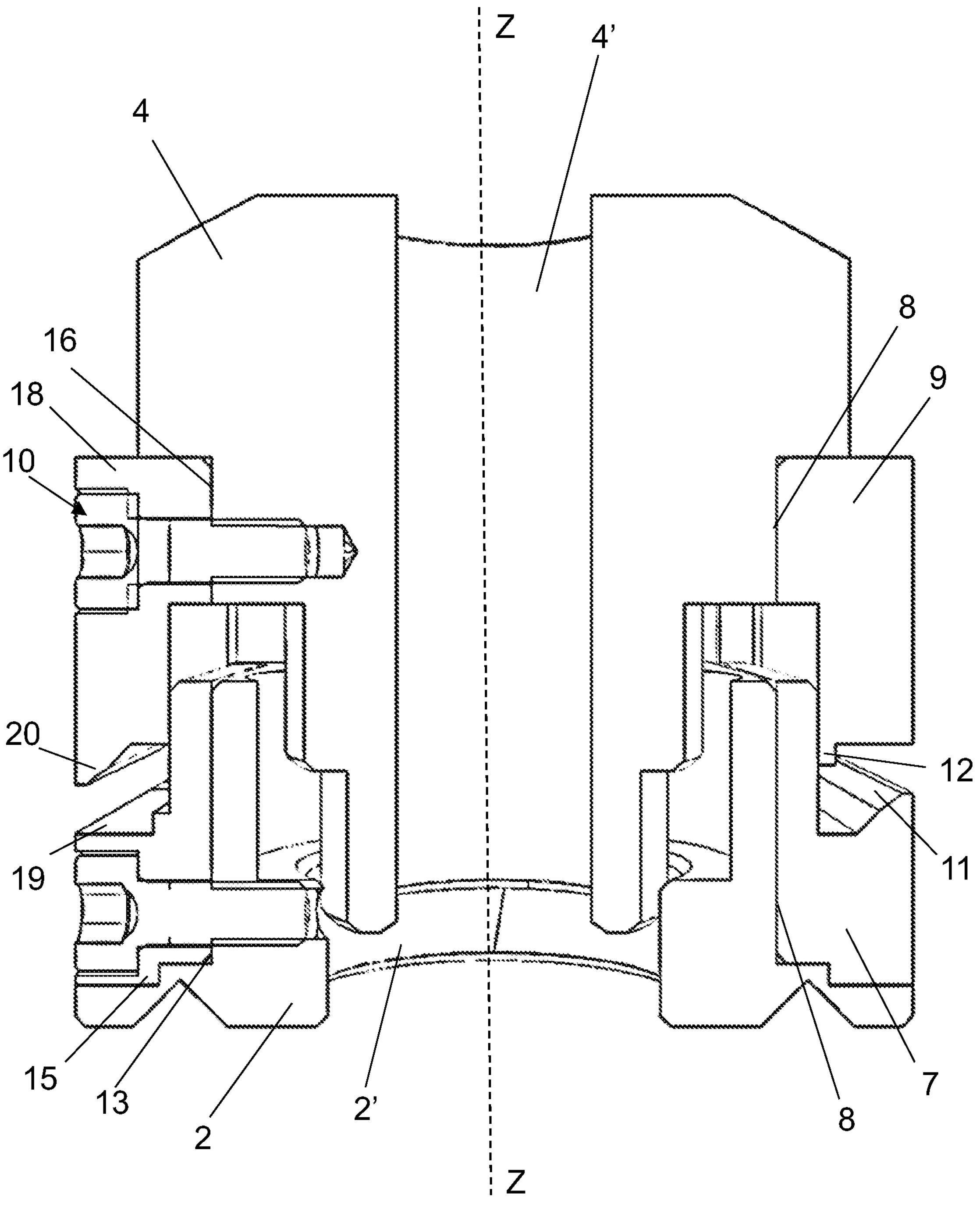
FIG. 6 shows a sectional front view made along the line VV of FIG. 4.

As can be seen from the figures, the clamp 1 according to the invention can be advantageously used in a key cutting machine (not shown in its entirety in the attached figures) to clamp a key, in particular a flat key, in a vice for its duplication by means of the use of the machine itself.

Preferably, the duplicating machine is of the traditional type and is per se known to those skilled in the art. Preferably, the key cutting machine is of the professional or semi-professional type, i.e. it is of the type generally present and used in key duplication centers.

The clamp 1 according to the invention for a key cutting machine comprises a lower jaw 2 with a polygonal plan, which—conveniently—is intended to be placed on a support 100 of a key cutting machine.

More in detail, preferably, the support 100 can be mounted on a structure movable in the X and Y directions of the machine with respect to the base of the machine, to which the cutter and the optical feeler/reader are fixed.

The lower jaw 2 is equipped with a first central hole 2', which is intended to be crossed by a pin 200 which extends along a main Z axis, to thus allow the lower jaw 2 to rotate around said pin. Conveniently, the main Z axis is oriented substantially vertically. Preferably, the main Z axis is substantially perpendicular to the X and Y directions of movement of the clamp 1 with respect to the base of the machine.

Advantageously, the correct positioning of the lower jaw 2 with respect to the support 100 can be obtained in the traditional way, for example by means of a solution such as that described in WO2015011095, or by means of vertical pins integral with the support itself and engaging in corresponding holes obtained in the lower jaw 2, or by means of a pivoting plate positioned on the face of the lower jaw 2 opposite to that of clamping and acting in such a way as to push the jaw itself against the pin 200, to which it is constrained together with the upper jaw.

The clamp 1 also comprises an upper jaw 4, with a polygonal plan, which is placed above the lower jaw 2 and which is equipped with a second central hole 4'. Conveniently, said second central hole 4' is aligned with the main Z axis of the first central hole 2' of the lower jaw 2 and is intended to be crossed by the pin 200, to thus allow the upper jaw 4 to rotate around said pin.

More in detail, the jaws 2, 4 of the clamp are mounted on the vertical pin 200 which is fixed to the support 100 in such a way as to allow each of the two jaws to be able to rotate with respect to the other and with respect to their support.

Preferably, the jaws 2 and 4 are made in a single body/piece, suitably shaped and machined.

Preferably, the lower jaw 2 and the upper jaw 4 are made of metallic material, such as for example steel.

The two jaws 2, 4 preferably have a square plan. Conveniently, the support 100 also has a square plan with the sides having substantially the same dimensions as those of the jaws 2, 4.

The lower jaw 2 comprises at least a first lower external face 3 facing outwards with respect to the first central hole 2'.

The upper jaw 4 comprises at least a first upper external face 5 facing outwards with respect to the first central hole 2'.

The lower jaw 2 is equipped with at least a first lower seat 6 obtained on the first lower outer face 3 and configured to house at least a first lower insert 7.

The upper jaw 4 is equipped with at least a first upper seat 8 obtained on the first upper outer face 5 and configured to house at least a first upper insert 9.

Conveniently, the first upper insert 9 of the upper jaw 4 is configured to cooperate with the first lower insert 7 of the lower jaw 2, in order to clamp an interposed key. In particular, the first lower insert 7 comprises a first lower gripping portion 11, suitably shaped, while the first upper insert 9 comprises a first upper gripping portion 12, also suitably shaped, to hold, in cooperation with the first portion clamp 11, a key interposed between them.

Advantageously, furthermore, following the rotation of one jaw relative to the other, the first upper insert 9 of the upper jaw 4 could cooperate with gripping portions/surfaces provided on other faces of the lower jaw 2, or the first lower insert 7 of the lower jaw 2 could cooperate with gripping portions provided on other faces of the upper jaw 4, to thus clamp a key interposed between them.

Conveniently, the first inserts 7 and 9 can be removably housed and inserted respectively into the first lower seat 6 of the lower jaw 2 and the first upper seat 8 of the upper jaw 4.

Conveniently, inserts 7 of various types, in particular having different configurations (in terms of shape and/or size) of the lower clamping portion 11, ie of the portion which—once the corresponding lower insert 7 has been inserted in the first lower seat 6—is turned towards/facing the upper jaw 4, can be removably inserted into the first lower seat 6 of the lower jaw 2.

Correspondingly, upper inserts 9 of various types can be removably inserted into the first upper seat 8 of the upper jaw 4, in particular having different configurations (in terms of shape and/or dimensions) of the portion of upper clamping 12, ie of the portion that—once the correspond the upper insert 9 has been inserted into the first upper seat 8—it faces/faces the lower jaw 2.

Conveniently, the first inserts 7 and/or 9 are shaped like a wedge or block.

Advantageously, the clamp 1 according to the invention can therefore be used in such a way as to avoid continually replacing the bodies of the jaws during its normal use, and this in response to the requests of different customers with different types of key. In fact, the operator can simply and only change the inserts 7 and 9 retained in the respective seats 6 and 8, and/or rotate the jaws with respect to the support and/or with respect to each other, in order to adapt clamp 1 to the specific key to be retained for duplication purposes.

Therefore, the clamp 1 for key cutting machine is extremely versatile and allows high productivity for the operator, as the same clamp can be used for a plurality of different keys, simply by changing the inserts and/or simply by rotating the two jaws with respect to each other so as to bring the desired/appropriate faces of each of the two jaws into correspondence with the operating area (ie in front of the cutter and/or the optical probe/reader) of the machine.

Furthermore, the clamp 1 is constructively completely reliable, and is endowed with high mechanical durability.

Preferably, the clamping portions 11 and 12, respectively of the first inserts 7 and 9, comprise surfaces facing each other which are shaped differently with respect to the clamping portions 11 and 12 of further and different first inserts, to thus allow—once they are the most suitable inserts have been chosen and installed to hold keys with different profiles.

More particularly, the facing surfaces of the clamping portions 11 and 12, respectively of the first inserts 7 and 9 of the two jaws 2 and 4, are flat or present ribs 23 and/or notches preferably complementary to the longitudinal grooves and/or ribs usually present in the key blade which must be held between the clamp jaws.

Advantageously, at least one face of the jaws 2, 4 of the clamp 1, a face which is devoid of seats for housing and removable fixing of an insert provided with a predefined clamping portion, comprises a corresponding clamping surface (flat or affected by grooves and/or ribs) which is formed in the same body as the jaw itself (ie it is defined by surfaces of the same piece that defines/constitutes the jaw, and not on a piece defining an insert). Preferably, all the other faces of the jaws 2, 4 of the clamp 1 which are devoid of seats for the housing and the removable fixing of an insert provided with a predefined clamping portion, comprise corresponding clamping surfaces (flat and/or affected by grooves) which are formed in the same body as the jaw itself (ie they are defined by surfaces of the same piece that defines the jaw, and not on the pieces of the inserts).

Advantageously, the upper portion of the pin 200 engages with a knob, not shown, having the function of locking the two jaws 2, 4 to the support 100 with a single maneuver, in contrast with the reaction of a spring interposed between them. Preferably, for this purpose, the upper portion of the pin 200 is threaded and engages in a corresponding threaded cavity obtained in the knob.

Conveniently, therefore, when the user wants to face the operating area (ie the tool/cutter and the probe/optical reader) of the duplicating machine, a specific face of the jaws of the clamp, preferably first loosens the constraint of the jaws by means of the actuation of the knob that holds them clamped, thus causing their spacing. Conveniently, therefore—preferably after the lower jaw 2 has been disengaged from the support 100—the two jaws 2, 4 can be rotated with respect to the support 100 and/or can be rotated with respect to each other, so as to face the tool or to the optical sensor/reader the selected faces of the jaws themselves. Subsequently, then, after having placed the key between the jaws, the key itself is locked in this position by activating the knob.

In accordance with a possible preferential embodiment, such as that illustrated in the attached figures, the lower jaw 2 is equipped with at least a second lower seat 13 obtained on a second lower external face 14 and configured to house at least a second lower insert 15.

Furthermore, the upper jaw 4 is advantageously provided with at least a second upper seat 16 obtained on a second upper external face 17 and configured to house at least a second upper insert 18.

Conveniently, the second lower insert 15 comprises a second lower gripping portion 19 and the second upper insert 18 comprises a second upper gripping portion 20 shaped to hold, cooperating with the second lower gripping portion 19, a key interposed between them.

Conveniently, the second upper insert 18 of the upper jaw 4 is configured to cooperate with the second lower insert 15 of the lower jaw 2, to thus clamp an interposed key. Moreover, advantageously, following the rotation of one jaw relative to the other, the second upper insert 18 of the upper jaw 4 can cooperate with clamping portions provided on other faces of the lower jaw 2, or the second lower insert 15 of the lower jaw 2 it can cooperate with clamping portions provided on other faces of the upper jaw 4, to thus retain a key interposed between them.

Advantageously, the second lower external face 14 faces in the opposite direction with respect to the first lower external face 3, ie they are defined on two mutually opposite faces of the lower jaw 2. Conveniently, in a possible embodiment not shown, the first 3 is the second lower external face 14 can be defined on two mutually adjacent faces of the lower jaw 2.

Advantageously, the second upper external face 17 faces in the opposite direction with respect to the first upper external face 5, ie they are defined on two mutually opposite faces of the upper jaw 4. Conveniently, in a possible embodiment not shown, the first 5 and the second upper outer face 17 can be defined on two mutually adjacent faces of the upper jaw 4.

Conveniently, the second inserts 15 and 18 are removably housed and inserted respectively into the second lower seat 13 of the lower jaw 2 and within the second upper seat 16 of the upper jaw 4.

Conveniently, second inserts 15 of various and different types can be removably inserted into the second lower seat 13 of the lower jaw 2, in particular having different configurations (in terms of shape and/or dimensions) of the lower gripping portion 19 i.e. of the portion which—once the corresponding insert 15 has been inserted in the second lower seat 9—is turned towards/facing the upper jaw 4.

Conveniently, in the second upper seat 16 of the upper jaw 4 are removable insertable second inserts 18 of various and different types, in particular having different configurations (in terms of shape and/or dimensions) of the upper gripping portion 20 i.e. of the portion which—once the corresponding insert 18 has been inserted in the first seat upper 16—is turned/facing towards the lower jaw 2.

Advantageously generally, the second inserts 15 and/or 18 are shaped like a gusset or block.

Conveniently, in order to allow the use of the same clamp 1 with a plurality of different keys, the second lower gripping portion 19 of the second lower insert 15 is shaped differently than the first lower gripping portion 11 of the first lower insert 7 and the second upper gripping portion 20 of the second upper insert 18 is shaped differently than the first upper gripping portion 12 of the first upper insert 9.

In this way, the clamp 1 according to the invention can be used to clamp at least two different types of keys, simply by rotating the upper jaw 4 and/or the lower jaw 2 of the clamp itself around the main Z axis, to thus turn towards the operating area (i.e. the area facing the tool/cutter and/or the probe/optical reader) of the machine the faces with the desired and most suitable inserts to clamp each type of key.

Preferably, the clamping portions 19 and 20, respectively of the second inserts 15 and 18 of the jaws 2 and 4, comprise mutually facing surfaces which are shaped differently with respect to the clamping portions 19 and 20 of other and different second inserts, in order to thus be able to hold keys with different profiles together.

More particularly, the facing surfaces of the gripping portions 19 and 20 of the second inserts 15 and 18 of the jaws 2 and 4 are flat or present ribs 23 and/or notches preferably complementary to the longitudinal grooves and/or ribs usually present in the stem of the key that must be held between the jaws of the clamp.

Advantageously, the clamp 1 comprises removable fixing means 10 for removably fixing each insert 7, 9, 15, and/or 18 in the corresponding seat 6, 8, 13 and/or 16 formed in the lower jaw 2 or higher 4

In particular, the removable fastening means 10 are configured to removably fix the first lower insert 7 in the first lower seat 6 of the lower jaw 2, the first upper insert 9 in the first upper seat 8 of the upper jaw 4, the second lower insert 15 in the second lower seat 13 of the lower jaw 2 and/or the second upper insert 18 in the second upper seat 16 of the upper jaw 4.

Preferably, said removable fastening means 10 comprise at least one dedicated fastening member, for example a screw or bolt, configured to pass through a through hole 25 (possibly internally threaded) obtained on the body of the corresponding insert, to engage (in particular medium screwing) into a blind receiving hole 24 (suitably threaded) obtained on a wall of the corresponding seat.

More in detail, preferably, the fixing means 10 comprise:

- at least one first screw 21 placed through the first lower insert 7 and engaged by screwing in the first lower seat 6 of the lower jaw 2,
- at least one second screw 22 placed through the first upper insert 9 and engaged by screwing in the first upper seat 8 of the upper jaw 4,
- at least one third screw 21' placed through the second lower insert 15 and engaged by screwing in the second lower seat 13 of the lower jaw 2,
- at least one fourth screw 22' placed through the second upper insert 18 and engaged by screwing in the second upper seat 16 of the upper jaw 4.

Conveniently, the inserts 7, 9, 15, and/or 18 are also made of metallic material, such as in particular steel.

Advantageously, in a possible embodiment not shown here, the removable fastening means 10 of the inserts 7, 9, 15, and/or 18 in the corresponding seats 6, 8, 13 and/or 16 can be of the magnetic type and, preferably, can comprise at least one magnetic portion associated and/or integrated in the inserts and configured to be magnetically fixed to an associated ferromagnetic part and/or integrated in the seats, or vice versa.

Advantageously, in a possible embodiment not shown here, the fixing means 10 comprise at least one protruding element, preferably made of elastic material, which is fixed on said inserts 7, 9, 15, 18 and a corresponding recess obtained in the relative seat 6, 8, 13, 16 on the corresponding jaw 2, 4 (or vice versa), configured to cooperate with each other to hold said inserts 7, 9, 15, 18 to the corresponding said seat 6, 8, 13, 16 in a removable shape relationship. Conveniently, the fastening means 10 comprise removable mechanical interlocking means and countermeans (preferably of the "interference/press/friction-fit" type) mounted and/or obtained respectively on each insert and on the corresponding seat.

In accordance with a further possible embodiment not illustrated in the attached figures, the clamp 1 according to the invention provides a different seat, for housing and fixing a corresponding insert, which is obtained on each upper and lower external face of the upper jaw 4 and/or lower jaw 2. Basically, on all the external faces of the upper jaw 4 and/or lower 2 there is a seat for housing and fixing a corresponding insert provided with a clamping portion.

For example, in the case of jaws with a square base, the clamp 1 can comprise four corresponding upper and lower seats for corresponding upper and lower inserts, to thus allow the use of the clamp with four different keys without the need to replace the inserts themselves but simply by rotating the jaws with respect to the support and/or between them, so as to face the operating area of the machine (ie the area facing the tool/cutter and/or the probe/optical reader) the inserts with the desired clamping portions/suitable for each type of key to be held.

Furthermore, each clamp 1 can be customized by each user/operator, providing different types of inserts for each face, in order to maximize the use of each individual clamp, once the most commonly used inserts have been chosen, for example for the normal customers or for the particular type of key widespread in the area.

Figure 9:
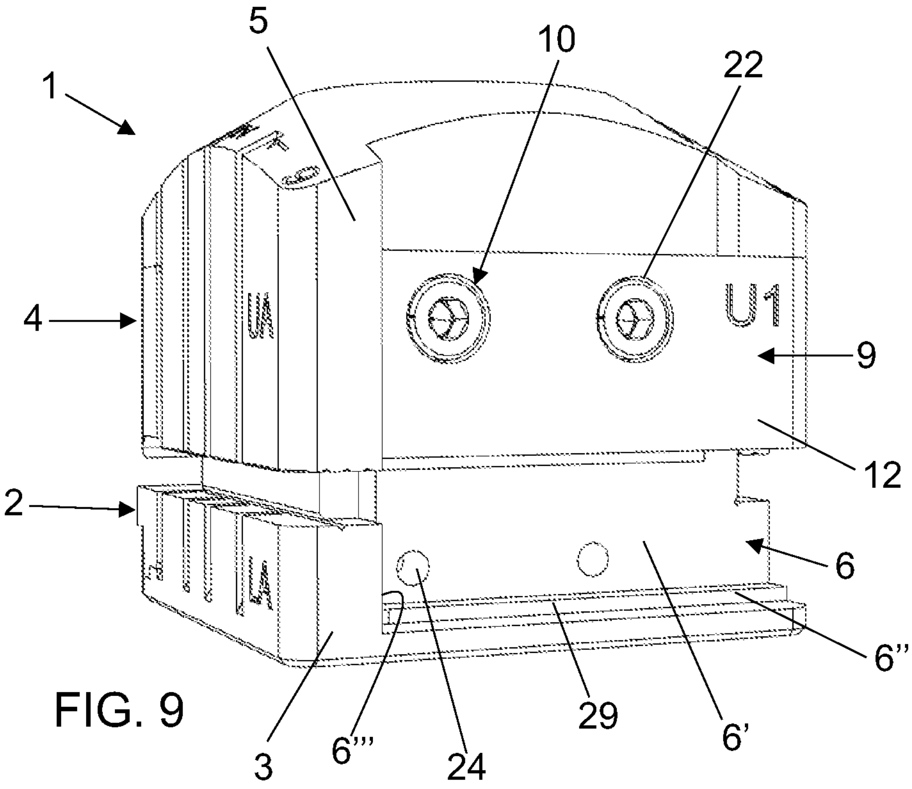
FIG. 9 shows a perspective view of the clamp according to the invention without the first lower insert.
Figure 10:
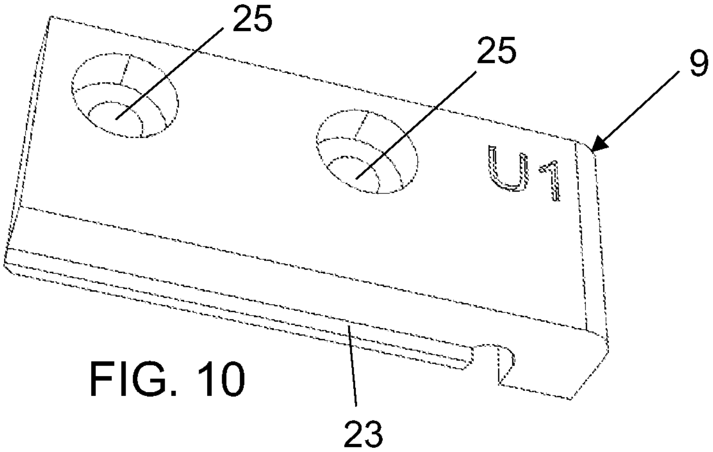
FIG. 10 shows a perspective view of the first upper insert.
Figure 11:
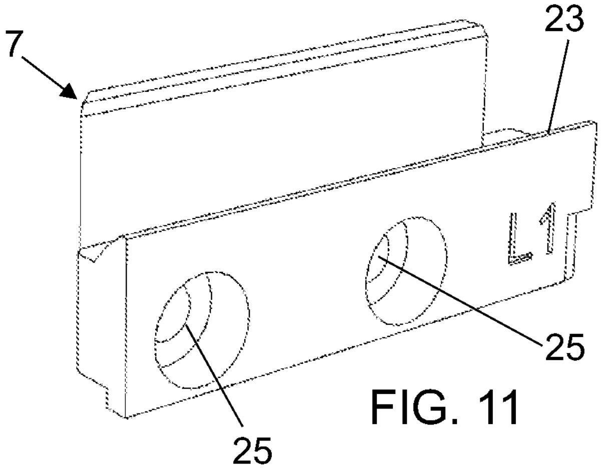
FIG. 11 shows a perspective view of the first lower insert.
Figure 12:
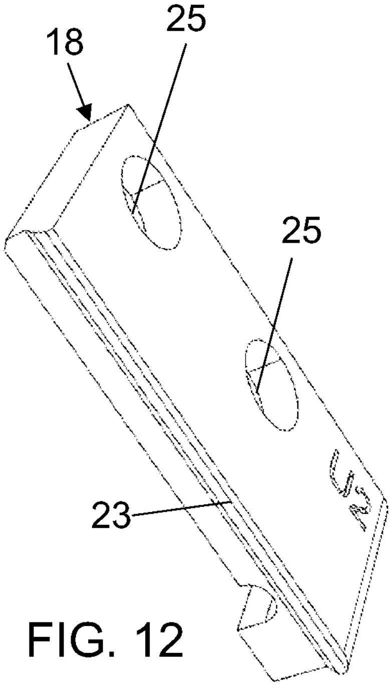
FIG. 12 shows a perspective view of the second upper insert.
Figure 13:
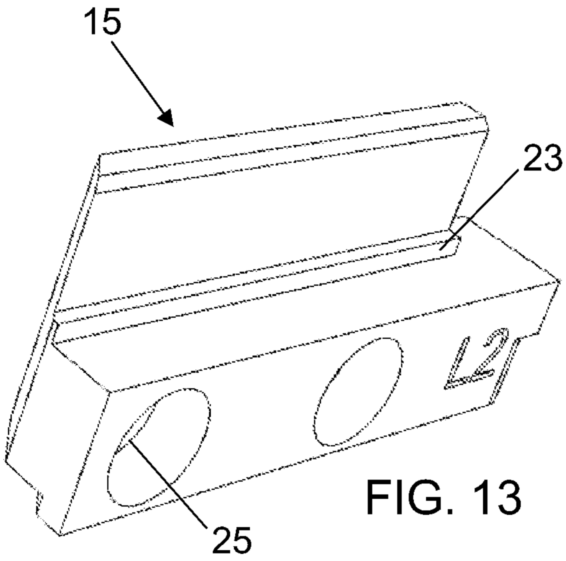
FIG. 13 shows a perspective view of the second lower insert.

Conveniently, as shown in FIG. 9, the first lower seat 6 is defined at least between a first rear wall 6' and also by a first bottom wall 6" and at least a first side panel 6" which project from the first rear wall 6' itself, and which are configured to house the first lower insert 7. Preferably, the first rear wall 6' develops substantially parallel or is slightly inclined to the Z axis, while the first bottom wall 6" is substantially perpendicular to the Z axis. Furthermore, preferably, between the first rear wall 6' and the first bottom wall 6", a shaped section can be provided, for example a step 29, for the engagement of a counter-shaped section provided in the corresponding insert to be to house and fix within the corresponding seat 6.

Preferably, the first lower seat 6 is made in depression on the first lower outer face 3 and can be defined by a bottom part 6" which acts as an insertion guide for the first lower insert 7 and laterally by a lateral edge 6'" which acts as an end-of-stroke wall to abut a corresponding lateral end of the first lower insert and prevent movement of the latter.

Figure 7:
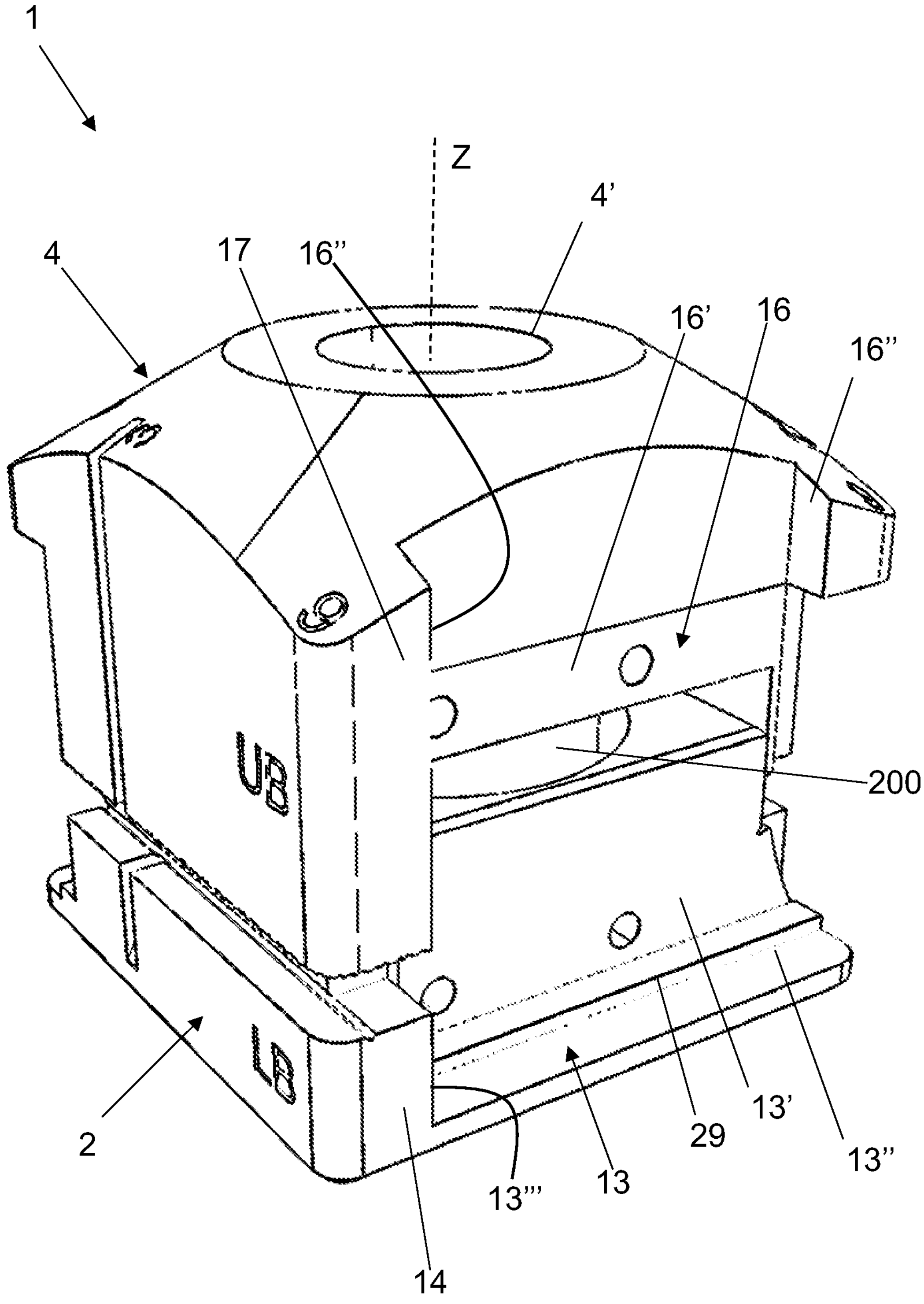
FIG. 7 shows a view perspective view of the clamp according to the invention without inserts.

Preferably, correspondingly, as shown in FIG. 7, the second lower seat 13 is defined by at least between a second rear wall 13' and also by a second bottom wall 13" and at least a first side panel 13'" which project from the first rear wall 13' itself, and which are configured to house the second lower insert 15. Preferably, the second rear wall 13' develops substantially parallel or is slightly inclined to the Z axis, while the second bottom wall 13" is substantially perpendicular to the Z axis. Furthermore, preferably, between the second rear wall 13' and the second bottom wall 13", a shaped section can be provided, for example a step 29, for the engagement of a counter-shaped section provided in the corresponding insert to be to house and fix within the corresponding seat 13.

Preferably, the second lower seat 13 is made in depression on the second lower outer face 14 and can be defined on one side bottom 13" which acts as an insertion guide for the second lower insert 15 and laterally by a side panel 6'" which acts as a limit switch wall to abut a corresponding lateral end of the second lower insert and prevent movement of the latter.

Figure 8:
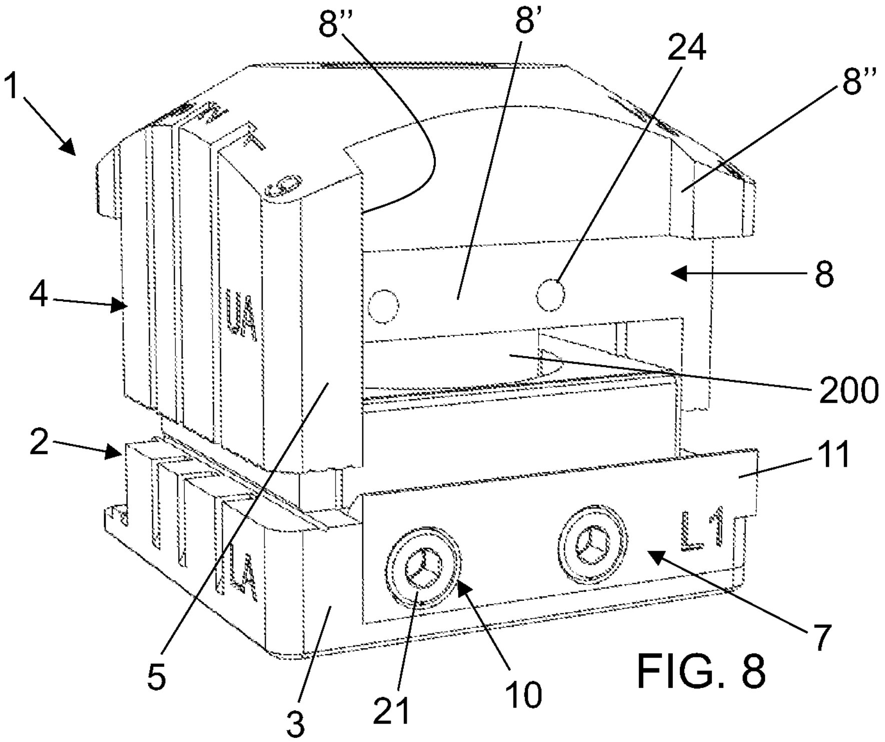
FIG. 8 shows a perspective view of the clamp according to the invention without the first upper insert.

Conveniently, as shown in FIG. 8, the first upper seat 8 is defined at least between a second rear wall 8' extending parallel to the main Z axis and two lateral sides 8" which project from the second rear wall 8' and are configured to house between them the first upper insert 9.

Preferably, the first upper seat 8 is made in depression on the first external upper face 5 and remains defined laterally by two second lateral sides 8" substantially parallel and spaced apart. Said second lateral sides 8' act as an insertion guide for the first upper insert 9 and as containment walls for the corresponding lateral ends of the first upper insert 9, to thus prevent lateral movement of the latter.

Preferably, correspondingly, as shown in FIG. 7, the second upper seat 16 is defined at least between a second rear wall 16' extending parallel to the main Z axis and two side walls 16" which project from the second rear wall 16' and are configured to house between them the second upper insert 18.

Preferably, the second upper seat 16 is made in depression on the second upper outer face 17 and remains defined laterally by two second lateral sides 16" substantially parallel and spaced apart. Said second lateral sides 16' act as an insertion guide for the second upper insert 18 and as containment walls for the corresponding lateral ends of the second upper insert 18, to thus prevent movement of the latter.

The present invention also relates to a key cutting machine, suitably equipped with at least one clamp of the type described up to now and of which, for the sake of simplicity of explanation, the same numerical references will be maintained.

The duplicating machine according to the invention comprises at least one support 100 which is mounted on an underlying base of the duplicating machine (not illustrated in the attached figures and per se well known to those skilled in the art).

Preferably, the key cutting machine is of the professional or semi-professional type, i.e. it is of the type generally present and used in key duplication centers.

Preferably, the key cutting machine comprises at least one operating area which is provided with at least one milling and/or cutting unit and at least one clamp 1, as described above, which is intended to hold a key to be coded and/or engraved to example at one face of his head.

Preferably, if the key cutting machine is of the mechanical or electronic type, it also comprises at least one unit for detecting the bitting of a key and at least one clamp 1, as described above, which is intended to hold a key of which you want to detect the encryption.

Conveniently, the bitting detection unit can comprise a mechanical feeler or an optical reader.

Otherwise, the duplicating machine may comprise means for reading at least one card, to perform the duplication on the basis of data pre-installed inside the card itself.

Preferably, the support 100 can be mounted on a structure movable in the X and Y directions of the machine with respect to the base of the machine, to which the cutter and/or the optical feeler/reader are fixed.

The machine also provides at least one pin 200 emerging upwards from the support 100 and having its upper end engageable by a clamping knob.

Conveniently, the machine also comprises at least one clamp 1 mounted on the support 100, which clamp comprises a lower jaw 2 with a polygonal plan, placed on the support 100 and equipped with a first central hole 2', which is equipped with a main Z axis and it is crossed by the pin 200 to allow the rotation of the lower jaw 2 around the main Z axis, and of at least a first lower external face 3 facing outwards with respect to the first central hole 2'.

The clamp 1 of the machine according to the invention also comprises an upper jaw 4 with a polygonal plan, placed above the lower jaw 2 and equipped with a second central hole 4' aligned with the main Z axis of the first central hole 2' and is crossed by the pin 200 to allow the rotation of the upper jaw 4 around the main Z axis, and of at least a first upper external face 5 facing outwards with respect to the first central hole 2'.

The lower jaw 2 is equipped with at least a first lower seat 6 obtained on the first lower outer face 3 and is configured to house at least a first lower insert 7.

Furthermore, the upper jaw 4 is equipped with at least a first upper seat 8 obtained on the first upper outer face 5 and configured to house at least a first upper insert 9 configured to cooperate with the first lower insert 7 of the lower jaw 2 to clamp an interposed key.

In this way, the key cutting machine according to the invention ensures its use, obviating the need to continuously change the clamp during normal use, due to different customers with different types of keys. In fact, the user can simply change only the inserts 7, 9 retained in the respective seats 6, 8 to thus adapt the jaws of the clamp 1 to the specific key to be duplicated.

Obviously, all the technical characteristics set out above with particular reference to the clamp 1 are equally referable, alone or in any possible combination, to the machine described up to now comprising at least one of the aforementioned clamps 1.

The present invention also relates to a method for the preparation of a clamp for a duplicating machine, which method comprises at least the following operating steps.

The method provides a first step for mounting a lower jaw 2 on a support 100 of a key cutting machine. In particular, the lower jaw 2 is positioned so that the pin 200, integral with the support 100, passes through a first central hole 2' of the lower jaw 2.

The method also provides for a second assembly step of an upper jaw 4 on the lower jaw 2 so that the second central hole 4' of the upper jaw 4 is traversed by the aforementioned pin 200.

Conveniently, the method also comprises a first removable fixing step of a first lower insert 7 inside a first lower seat 6 obtained on a first lower external face 3 of the lower jaw 2.

Furthermore, suitably, the method provides for a second removable fixing step of a first upper insert 9 inside a first upper seat 8 obtained on a first upper external face 5 of the upper jaw 4.

The first upper insert 9 is configured to cooperate with the first lower insert 7 of the lower jaw 2 to clamp a key interposed between them.

Advantageously, the first fixing step involves:

position the first lower insert 7 in the first lower seat 6 until the through holes 25 obtained on the first lower insert are aligned with corresponding blind holes 24 obtained on the rear wall 6' itself, lock in a stable but removable way the first lower insert 7 inside the first lower seat 6 by activating corresponding fastening means 10.

More in detail, the fastening means 10 can comprise at least a first screw 21 which, during the fastening step, is inserted inside one of the corresponding through holes 25 made in the first lower insert to reach the corresponding blind receiving hole obtained in the rear wall 6' and preferably internally provided with a thread to constrain the aforementioned first screw 21 of the fixing means 10 in a screwing relationship.

Advantageously, the second fixing step involves:

position the first upper insert 9 in the first upper seat 8 until the through holes 25 obtained on the first upper insert 9 are aligned with corresponding blind holes 24 obtained on the rear wall 8' itself, lock in a stable but removable way the first upper insert 9 inside the first upper seat 8 by activating corresponding fastening means 10.

More in detail, the fastening means 10 can comprise at least a second screw 22 which, during the fastening step, is inserted inside one of the corresponding through holes 25 obtained in the first upper insert 9 to reach the corresponding blind hole of reception obtained in the rear wall 8' and preferably provided internally with a thread to constrain the aforementioned second screw 22 of the fixing means 10 in a screwing relationship.

Similarly, in order to change inserts 7, 9 in the event that it is necessary to clamp a different type of key, the user releases the first and second screws 21, 22 by unscrewing the latter from their respective blind holes 24, suitably threaded, obtained in the rear walls 6', 8' of the respective lower and upper seats 6, 8.

Subsequently, the operator performs a phase of removal of the inserts 7, 9 and then performs subsequent fixing phases of different inserts 7, 9, to thus allow the clamping of a different type of key.

Advantageously, the aforementioned steps can also be carried out if necessary to fix second inserts 15 and 18, or for any further inserts, in respective second (or further) seats obtained in the lower and/or upper jaw.

Conveniently, the step of fixing each insert in the corresponding seat of the upper 4 and/or lower 2 jaw can be carried out on the respective and single jaws before their assembly on the support 100 (i.e. before the respective holes 2 and 2' of the jaws are crossed by the pin 200), or it can be carried out on the jaws already mounted/installed on the support 100.

Conveniently, the step of fixing each insert in the corresponding seat of the upper jaw 4 and/or lower jaw 2 can be carried out by means of the magnetic or interlocking fastening means, as described above, provided on each insert and on the respective seat.

Conveniently, once the clamp 1 has been set up, the jaws 2, 4 can be rotated with respect to the support 100 and/or with respect to each other so as to face the operating area (i.e., the tool/cutter and/or the optical sensor/reader) of the machine the faces provided with the most suitable portions and/or clamping surfaces to hold each type of key to be coded, engraved and/or read.

Conveniently, in the case of fully digital key cutting machines configured to perform the duplication known in the technical jargon of the “card” sector (ie a duplication based on a map preloaded in a key property sheet), the card itself may also contain (in addition to the data relating to the encryption and/or the profile of the key) the data relating to the insert to be used to clamp the key.

From what has been said it is clear that the clamp according to the invention is much more advantageous than the traditional ones in that:

allows its versatile use, with different types of keys, simply by changing the inserts fixed in the respective seats of the jaws, without the need to replace the entire jaw, as the clamp can be customized by equipping it with the series of inserts most suitable for the type of keys disseminated in the operator’s area of competence;

is constructively simple to realize it is completely reliable, allows the operator to economically save by obviating the need to purchase additional clamps, having to purchase only the necessary inserts, and not the entire body of each jaw.

The present invention has been illustrated in a preferred embodiment thereof, but it is understood that executive variations may be applied to them in practice, without however departing from the scope of protection of the present patent for industrial invention.

The invention claimed is:

1. Clamp for key cutting machine, said clamp comprising:

a lower jaw with a polygonal shape, configured to be placed on a support of a key cutting machine and equipped with a first central hole for crossing a pin fixed to said support and allowing rotation of said lower jaw around said pin, said lower jaw comprising at least a first lower external face facing outwards with respect to said first central hole;

an upper jaw with a polygonal shape, placed above said lower jaw and equipped with a second central hole, aligned with said first central hole, for the crossing of said pin and allowing rotation of said upper jaw around said pin, said upper jaw comprising at least a first upper external face facing outwards with respect to said first central hole;

at least a first lower insert and at least a first upper insert, and removable fixing means for removably fixing said first lower insert in the first lower seat of said lower jaw and said first insert upper in the first upper seat of said upper jaw, wherein said lower jaw is equipped with at least a first lower seat which is obtained on the first lower external face and which is configured to house said at least one first lower insert, said upper jaw is equipped with at least a first upper seat which is obtained on the first upper external face and which is configured to house said at least one first upper insert configured to cooperate with said first lower insert of said lower jaw to clamp an interposed key.

2. The clamp according to claim 1, wherein said fixing means comprise:

at least a first screw placed to pass through said first lower insert and engaged by screwing in said first lower seat of said lower jaw;

at least a second screw placed to cross said first upper insert and engaged by screwing in said first upper seat of said upper jaw.

3. The clamp according to claim 1, wherein said fixing means comprise at least one magnetic portion associated and/or integrated in the inserts and configured to be magnetically fixed to a ferromagnetic part associated and/or integrated in the seats, or vice versa.

4. The clamp according to claim 1, wherein said fixing means comprise removable mechanical interlocking means and countermeans which are mounted and/or obtained respectively on/in said inserts and on/in said locations.

5. A clamp for key cutting machine, said clamp comprising:

a lower jaw with a polygonal shape, configured to be placed on a support of a key cutting machine and equipped with a first central hole for crossing a pin fixed to said support and allowing rotation of said lower jaw around said pin, said lower jaw comprising at least a first lower external face facing outwards with respect to said first central hole;

an upper jaw with a polygonal shape, placed above said lower jaw and equipped with a second central hole, aligned with said first central hole, for the crossing of said pin and allowing rotation of said upper jaw around said pin, said upper jaw comprising at least a first upper external face facing outwards with respect to said first central hole;

at least a first lower insert and at least a first upper insert, wherein said lower jaw is equipped with at least a first lower seat which is obtained on the first lower external face and which is configured to house said at least one first lower insert, said upper jaw is equipped with at least a first upper seat which is obtained on the first upper external face and which is configured to house said at least one first upper insert configured to cooperate with said first lower insert of said lower jaw to clamp an interposed key and, wherein said first lower insert comprises a first lower gripping portion and said first upper insert comprises a first upper gripping portion shaped to hold, in cooperation with said first lower clamp portion, a key interposed therebetween.

6. A clamp for key cutting machine, said clamp comprising:

a lower jaw with a polygonal shape, configured to be placed on a support of a key cutting machine and equipped with a first central hole for crossing a pin fixed to said support and allowing rotation of said lower jaw around said pin, said lower jaw comprising at least a first lower external face facing outwards with respect to said first central hole;

an upper jaw with a polygonal shape, placed above said lower jaw and equipped with a second central hole, aligned with said first central hole, for the crossing of said pin and allowing rotation of said upper jaw around said pin, said upper jaw comprising at least a first upper external face facing outwards with respect to said first central hole;

at least a first lower insert and at least a first upper insert, and at least a second lower insert and at least a second upper insert wherein:

said lower jaw is equipped with at least a first lower seat which is obtained on the first lower external face and which is configured to house said at least one first lower insert, said upper jaw is equipped with at least a first upper seat which is obtained on the first upper external face and which is configured to house said at least one first upper insert configured to cooperate with said first lower insert of said lower jaw to clamp an interposed key.

7. The clamp according to claim 6, wherein said second lower insert comprises a second lower gripping portion and said second upper insert comprises a second upper gripping portion shaped to hold, in cooperation with said second lower clamp portion, a key interposed between them.

8. The clamp according to claim 7, wherein the second lower gripping portion of said second lower insert is shaped differently than the first lower gripping portion of said first lower insert and the second upper gripping portion of said second upper insert is shaped differently with respect to the first upper gripping portion of said first upper insert.

9. The clamp according to claim 1, wherein:

said lower jaw is equipped with at least a second lower seat which is formed on a second lower external face and which is configured to house said at least one second lower insert or said at least one first lower insert;

said upper jaw is equipped with at least a second upper seat which is obtained on a second upper external face and which is configured to house said at least one second upper insert or said at least one first upper insert.

10. The clamp according to claim 9, wherein:

said first lower external face and said second lower external face are formed on two mutually opposite faces of the lower jaw, and said first upper external face and said second upper external face are formed on two mutually opposite faces of the upper jaw.

11. The clamp according to claim 1, wherein:

on each external face of said lower jaw there is a corresponding lower seat for housing and removable fixing of at least one lower insert;

on each external face of said upper jaw there is a corresponding upper seat for housing and removable fixing of at least one upper insert;

said lower inserts comprise a corresponding lower gripping portion and said upper inserts comprise a corresponding upper gripping portion shaped to hold, in cooperation with said portion clamp, a key interposed between them.

12. The clamp according to claim 1, wherein at least one face of said lower jaw and of said upper jaw is devoid of seats for housing and removable fixing of an insert.

* * * * *